UNITED STATES PATENT OFFICE 1,972,032

PROCESS FOR MAKING NEUTRAL SODIUM PYROPHOSPHATE

Albert Reimann, Ludwigshafen-on-the-Rhine, Germany

No Drawing. Application May 11, 1933, Serial No. 670,617. In Germany May 9, 1932

1 Claim. (Cl. 23—106)

In order to make neutral pyrophosphate it has hitherto been necessary first of all carefully to dehydrate disodium phosphate containing 12 molecules of water of crystallization $$(Na_2HPO_4.12H_2O),$$

the ordinary sodium phosphate of commerce, and to ignite this dehydrated product in a second operation.

Usually the procedure was such that the salt was fused at about 35° C. in its water of crystallization and the melt dehydrated over hot rollers, an anhydrous disodium phosphate being obtained thereby in the form of scales. This anhydrous disodium phosphate was then converted into neutral pyrophosphate by heating to about 300 to 400° C. in a furnace. The whole process can be represented by the following equations:

$$Na_2HPO_4.12H_2O = Na_2HPO_4 + 12H_2O$$
$$2Na_2HPO_4 = Na_4P_2O_7 + H_2O$$

This process is bothersome, time-consuming and furthermore, requires too large apparatus. Above all, however, it does not permit of continuous operation.

It has now been found that neutral pyrophosphate can be made from disodium phosphate in a single operation and in a continuous process if one commences with disodium phosphate containing two molecules of water of crystallization. In contradistinction to disodium phosphate containing 12 molecules of water of crystallization this phosphate containing only two molecules does not fuse. The conversion, therefore, can be carried out continuously by first of all dehydrating the water-deficient disodium phosphate, by means of hot furnace gases in one zone of, for example, a rotary furnace and then igniting in a second zone of the furnace and so converting into neutral pyrophosphate.

Should the final product be somewhat discoloured this can be obviated by admixing small quantities of an oxidizing agent with the starting material.

What I claim is:

A process for the continuous manufacture in a single operation of neutral sodium pyrophosphate in the form of crystals, consisting in dehydrating disodium orthophosphate dihydrate in one zone of a rotary tube furnace and igniting the dehydrated product in another zone of the furnace.

ALBERT REIMANN.